United States Patent
Starck et al.

(10) Patent No.: US 7,313,322 B2
(45) Date of Patent: Dec. 25, 2007

(54) ELECTRICAL HEATING FACILITY FOR THE HEATING OF LIQUID IN A MOTOR VEHICLE

(76) Inventors: Roland Starck, Im Vogelgesang 29, 75756 Bellheim (DE); Franz Flick, Essinger Strasse 86, 76877 Offenbach (DE)

( * ) Notice: Subject to any disclaimer, the term of this patent is extended or adjusted under 35 U.S.C. 154(b) by 0 days.

(21) Appl. No.: 11/299,406

(22) Filed: Dec. 12, 2005

(65) Prior Publication Data
US 2006/0140598 A1 Jun. 29, 2006

(30) Foreign Application Priority Data
Dec. 23, 2004 (DE) .................. 10 2004 062 605

(51) Int. Cl.
*F24H 1/18* (2006.01)
(52) U.S. Cl. .................. 392/441; 392/447; 392/452
(58) Field of Classification Search .................. None
See application file for complete search history.

(56) References Cited

U.S. PATENT DOCUMENTS 3,888,412 A * 6/1975 Lindo .................. 237/12.3 B

FOREIGN PATENT DOCUMENTS

| DE | 1 021 518 | 12/1957 |
|----|-----------|---------|
| DE | 1765842 | 4/1972 |
| DE | 7534443 | 3/1976 |
| DE | 7701011 | 4/1977 |
| DE | 3201367 A1 | 7/1983 |
| DE | 102 58 257 A1 | 7/2003 |
| DE | 203 15 852 U1 | 1/2004 |
| DE | 2003 01 655 U1 | 7/2004 |
| EP | 1 213 197 A1 | 12/2000 |
| FR | 2 634 090 A1 | 7/1988 |

* cited by examiner

*Primary Examiner*—Thor S. Campbell

(57) ABSTRACT

The invention describes an electrical heating facility for the heating of liquid, in particular of washing liquid of a window washing facility, in a motor vehicle, comprising a metallic housing (2) with a first end (3) for immersion in the liquid to be heated and a second end (4) with an electrical connection terminal (5); at least one heating element (11) that is arranged in the housing (2); and at least one metallic heat conducting element (20) for conducting heat away from the housing (2). The invention provides the heat conducting element (2) as a stamped-out heat conducting plate comprising a slit that is used to slide it onto the housing (2). Moreover, the invention describes a liquid container with a heating facility, in which a heat contact surface of the heat conducting element (20) of the heating facility (1) rests against an intake fitting (31) that protrudes into the container.

25 Claims, 5 Drawing Sheets

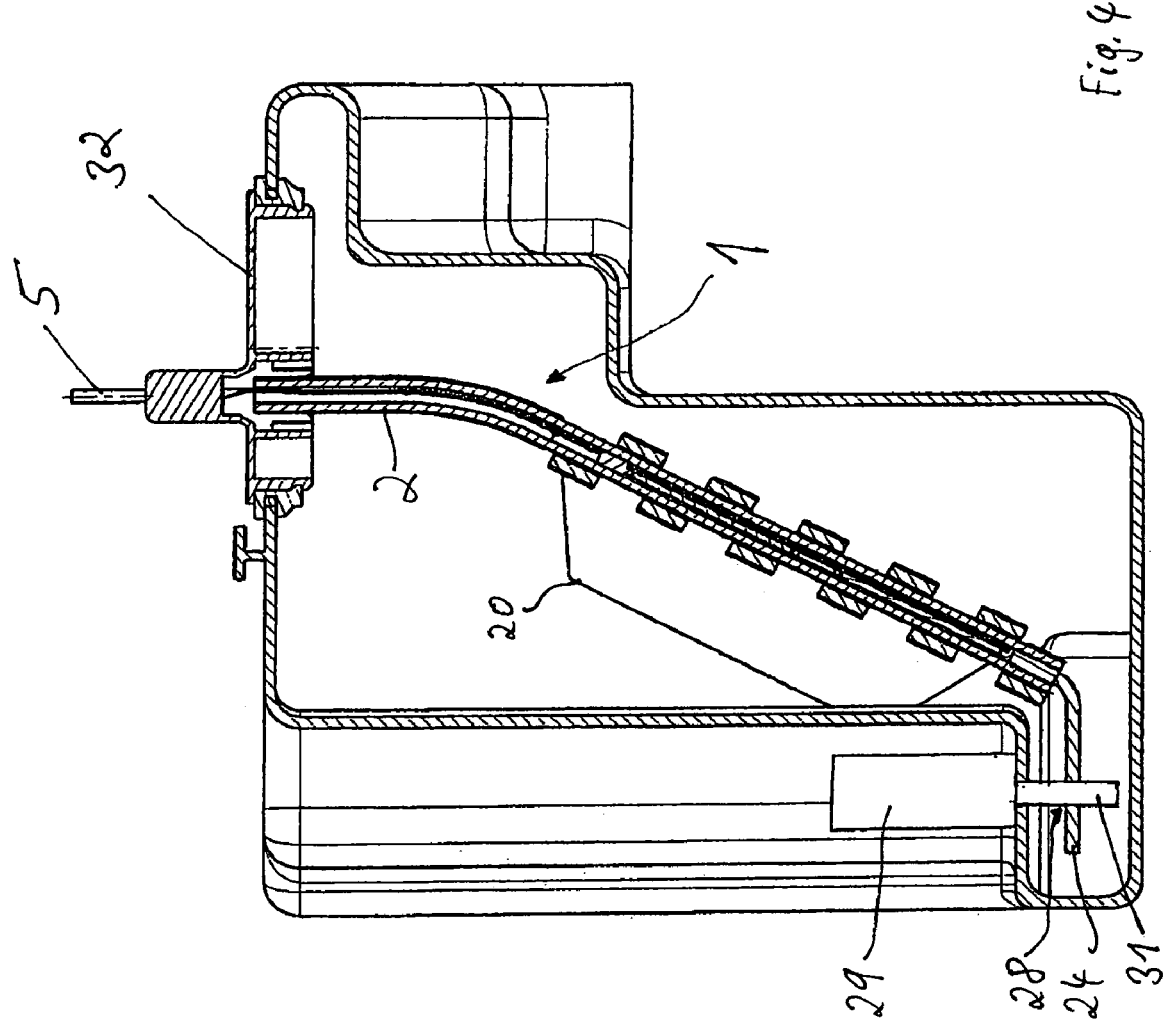

ELECTRICAL HEATING FACILITY FOR THE HEATING OF LIQUID IN A MOTOR VEHICLE

The invention concerns an electrical heating facility for the heating of liquid, in particular of washing liquid of a window washing facility, in a motor vehicle, comprising a metallic housing with a first end for immersion in the liquid to be heated and a second end with an electrical connection terminal at least one heating element that is arranged in the housing; and at least one metallic heat conducting element for conducting heat away from the housing. Moreover, the invention concerns a liquid container for a motor vehicle for taking up washing liquid of a window washing facility comprising an intake fitting for a liquid pump for conveying the liquid and an electrical heating facility for heating the liquid.

A heating facility of this type is known from DE 203 15 852 U1. In the known heating facility, the housing is encased by a body from which originate large-surfaced metallic heat conducting elements. The body consists of two parts which each are provided with connection latches by means of which the parts are connected by screws or rivets and thus are attached on the housing.

The heat conducting elements of the known heating facility form chamber-like hollow spaces that are open on their top and bottom. If all liquid in the tank is frozen as a solid block the heat conducting elements form during the thawing process ice columns. These ice columns are surrounded by the heat conducting elements and can be fully thawed or melted more rapidly because heat is supplied from all sides, and, in addition, these ice columns can tilt to one side which also allows them to directly contact a heat conducting element, i.e. a wall of the chamber, and thus melt more rapidly.

The object of the invention is to propose a way in which an electrical heating facility of the type mentioned above can be manufactured more cost-efficiently.

The object is solved according to the invention in that the heat conducting element is a stamped-out heat conducting plate comprising at least one slit that is used to slide it onto the housing.

This means simplifies the manufacture significantly. There is no longer a need for tedious attachment of a multi-part heating element on the housing by means of screws or rivets. A heat conducting plate can be manufactured with significantly less effort as compared to the manufacture of the relatively complicated and difficult to manufacture heat conducting elements according to the prior art, in which large-surfaced elements originate from coil body parts. The manufacture of a heating facility according to the invention is particularly simple if the heat conducting element is compressed against the housing after it is slid onto the housing.

Compressing provides not only for good heat conducting contact, but also allows the heat conducting element to be manufactured with the corresponding tolerance such that it is easier to slide on. A slit by means of which the heat conducting element is slid onto the housing is easy to stamp-in and flip open to allow the sliding onto the housing. Preferably, at least two slits are provided and penetrated by the housing in order to provide for good heat conducting contact.

Preferably, the heat conducting plate is at least 2 mm thick. Surprisingly, with a thinner plate heat is transported in a liquid poorly due to its larger heat exchange area such that the liquid is heated only locally.

A heating facility for the heating of a washing liquid for a window washing facility of a motor vehicle must be capable of thawing in a short period of time (approx. 20 min.) at least ¼ liters of washing liquid such that the liquid can be sprayed by a liquid pump. It has been found that even with heating facilities with basically sufficient heating power it is occasionally impossible to spray washing water even after 20 minutes of operation. Usually, this is due to the fact that even though a large amount of washing liquid was thawed in the container in these cases, there still remains ice in an intake area of the pump effectively blocking the flow of liquid.

Using the metallic heat conducting element of a heating facility according to the invention, heat can be conducted from the housing to a particularly critical volume element of the liquid container, for example a liquid passage or an intake opening. It is particularly advantageously if the heat conducting element touches on an intake fitting of the pump that protrudes into the liquid container. By this means, heat can be conducted into this critical area particularly effectively and washing liquid can be thawed to flow into the fitting.

Preferably, a heat contact surface of the heat conducting element rests against the intake fitting of the liquid pump. To provide for good heat conduction, the intake fitting should be contacted by the heat contact surface on at least half of its circumference. In the case of an intake fitting comprising lateral openings this can be attained most easily if the end of the intake fitting that protrudes into the liquid container rests on the heat conducting plate. Another possibility is to provide a heat conducting plate with a recess shaped to fit the intake fitting whereby the recess surrounds the intake fitting. Typically, the intake fitting has a circular cross-section such that the edge of the heat conducting plate is provided with a semi-circular recess and the intake fitting is contacted exactly on half of its circumference in this case.

It is particularly advantageous to provide the heat conducting element with a hole through which protrudes the intake fitting such that it contacts the heat conducting element on all of its circumference. If the heat conducting element is a heat conducting plate, a hole surrounded by latches can be stamped-in, for example by creating slits. When the intake fitting is pushed through the breaking-through, the latches are bent back and rest springy against the intake fitting which provides for a particularly large heat contact surface.

As part of the invention it was found that heat conducting elements with an open structure which is exposed to the liquid to be heated, allow for more rapid heating. In particular, a channel from a refill opening of the liquid tank to the intake area of the pump can be melted more rapidly using a heating facility according to the invention. For this purpose, it is particularly advantageous for the housing of the heating facility to be made of an aluminum alloy. Since aluminum alloys possess significantly better heat conductibility than, for example, stainless alloys that are commonly used for housings of heating facilities, the heat produced by the heating elements distributes more evenly across a housing tube made of an aluminum alloy as compared to a housing tube made of stainless steel. Arranging the housing tube of a heating facility according to the invention parallel to the channel to be melted allows the heat produced by the heating elements to be distributed over the entire length of the channel to be thawed.

A substantial fraction of the costs of a heating facility is accounted for by the housing. A typical example is the heating facility known from DE 102 58 257 A1. This heating facility can be used to heat diesel fuel, cooling water or urea as an ammonia supplier for a catalyst. The housing of the known heating facility is an impact extrusion part made of aluminum in which resides a heating insert with one or more PTC heating elements. After insertion of the heating elements, the housing is compressed such that a good thermal contact between the heating elements and the housing is generated. Although the known heating facility is suitable for heating a wide range of liquids in a motor vehicle, and is sufficiently robust to withstand the ice pressure if the liquid freezes, it has been found that, depending on assembled position, liquid to be heated or shape of the corresponding liquid container, cost-intensive design adaptations are required in order to meet application-specific requirements with regard to the dimensions and/or heating power.

Usually, with each new or further development of a motor vehicle, the dimensions of the liquid containers present therein and, possibly, the heating power requirements of the heating facility required in the individual case are subject to change. For this reason, the known heating facility is associated periodically with substantial costs whenever adaptation to changed liquid containers of new motor vehicle models is required.

Using a tube, in particular a special section tube, as housing allows for significant cost savings as compared to the prior art, in which an impact extrusion part or deep-drawn housing was used. A deep-drawn housing or an impact extrusion part necessitate substantial tool costs, which need to be re-invested every time a change in the dimensions of the heating facility is made. In contrast, a special section tube can be manufactured or obtained from suppliers cost-efficiently as a standard part. Adaptations to changed liquid containers can be made easily by cutting the special section tube to the desired length or by bending it, if needed. Like the length, the number of heating elements that are used and therefore the heating power can be easily adapted to changed requirements.

A heating facility with a special section tube as housing may appear disadvantageous at first view in that the end that is immersed in the liquid must be sealed with considerable effort in order to render it sufficiently durable and reliably leak-proof even upon exposure to the expected thermal stress of frequent heating, cooling down, and freezing of the liquid (temperature range from −30° C. to +130° C.). In particular, the heating facility must be capable of withstanding ice pressure in case the liquid freezes.

Surprisingly, it has been evident that the special section tube can be sealed to be leak-proof using a closure made of plastic. For example, the closure can be provided by sealing the end of the special section tube to be sealed with a suitable pourable sealing compound made of plastic material. Preferably, the closure is a stopper made of plastic material. This means renders the manufacture particularly cost-efficient. During assembly, the stopper is simply pushed into the end of the special section tube to be sealed. Particularly well-suited are plastic materials with a Shore A hardness (at room temperature) of 40-80, preferably of 50 to 70, particularly preferably of 55 to 65. Preferably, the plastic material is an elastomeric plastic material, for example a thermoplastic elastomer or a caoutchouc mixture, for example NBR (acrylo-nitrile-butadiene) or HNBR. Ethylene-propylenediene-caoutchouc is particularly well-suited. Preferably, the plastic material has a short-term permanent set of less than 30%, particularly preferably of less than 25%, in particular less than 20%.

It is particularly cost-efficient for the heat conducting element to be a stamped-out heat conducting plate, for example made of an aluminum alloy.

Further details and advantages of the present invention are illustrated in the following based on an exemplary embodiment making reference to the attached drawings. The features described herein can be used separately or in combination in order to create preferred developments of the invention. In the figures:

FIG. 4 shows a partial sectional side view of a liquid container containing the heating facility shown in FIGS. 1 to 3;

Figure 1:
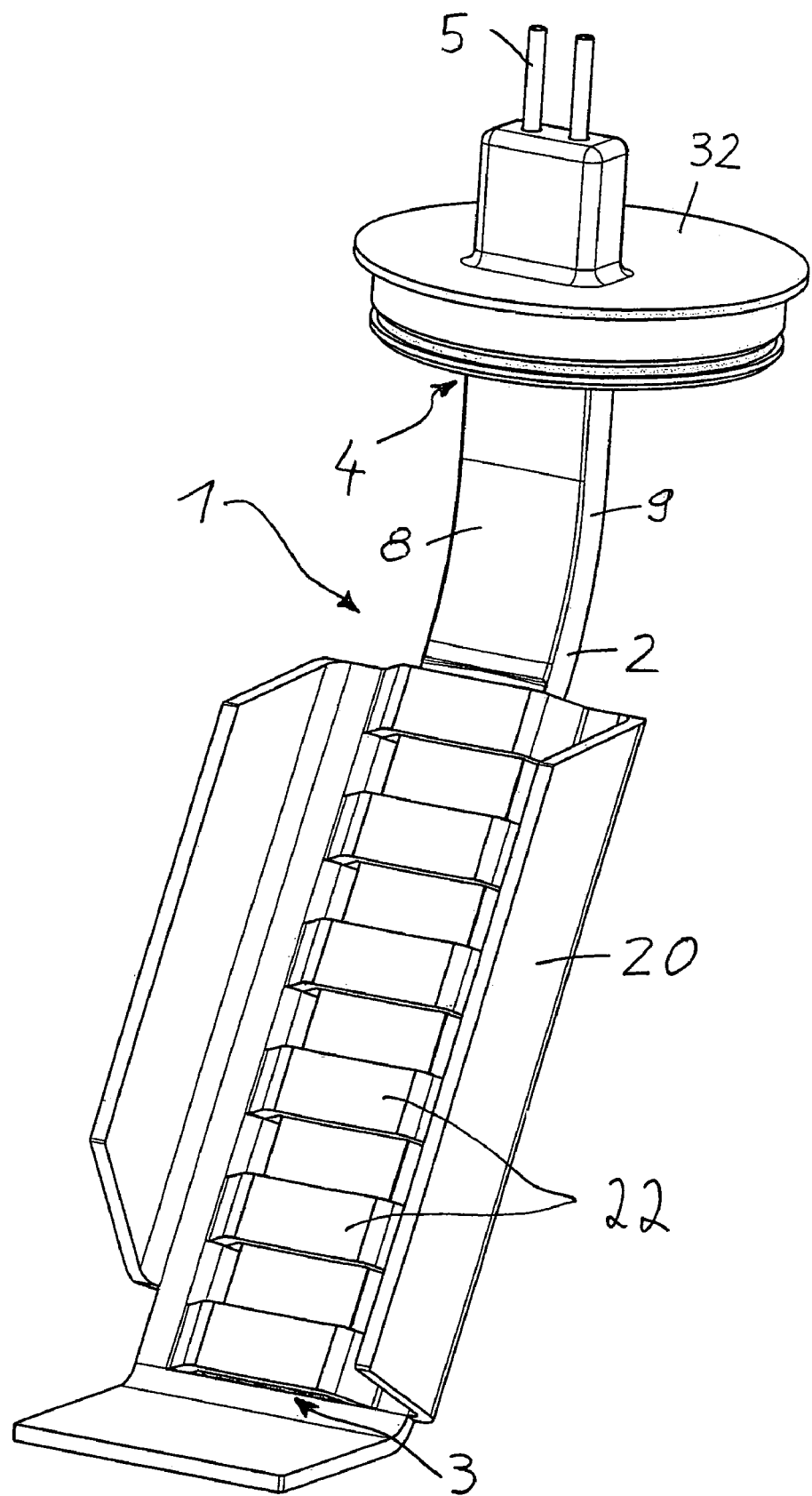
FIG. 1 shows a front view of an exemplary embodiment of a heating facility according to the invention.
Figure 2:
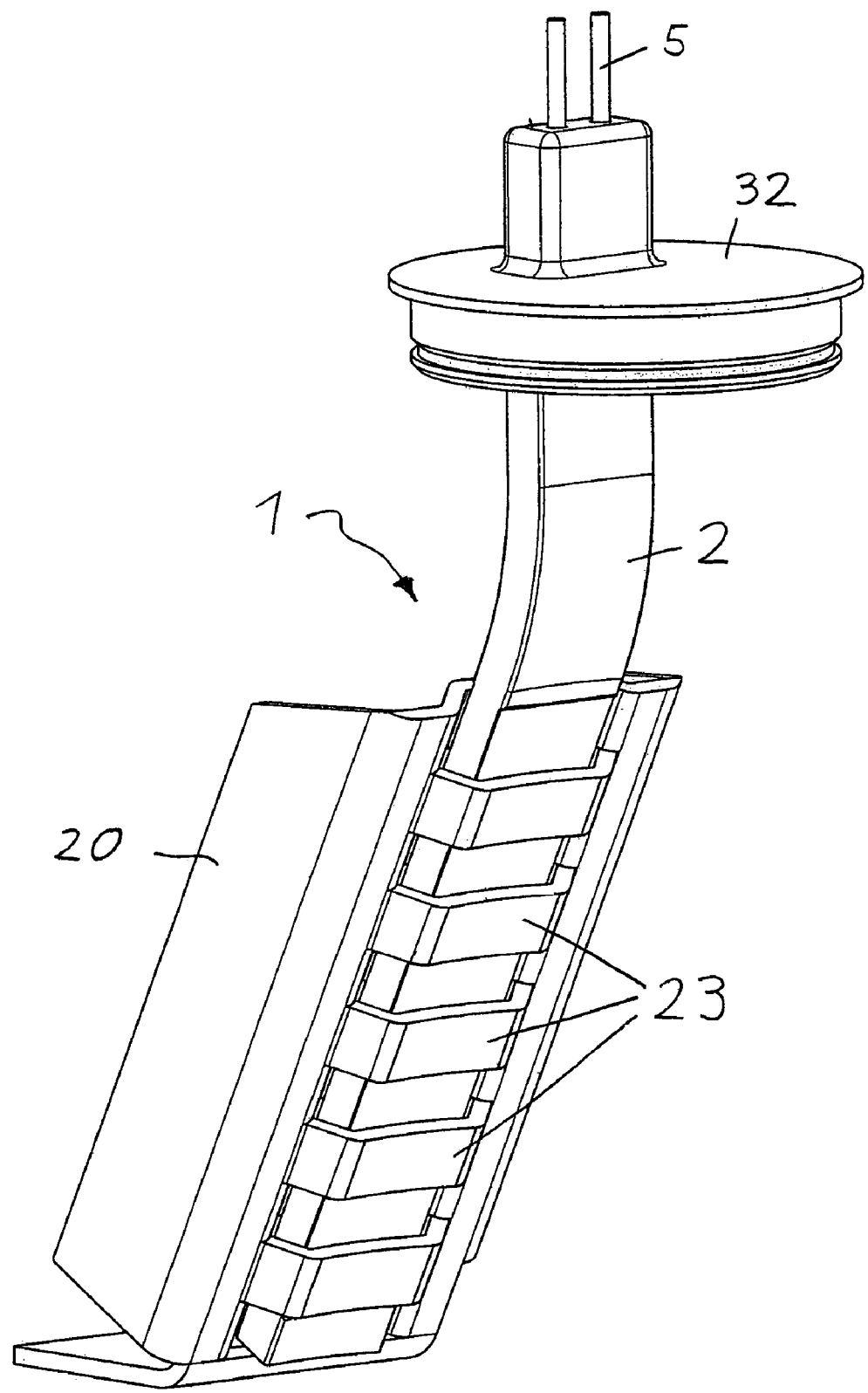
FIG. 2 shows a back view of the exemplary embodiment shown in FIG. 1.
Figure 3:
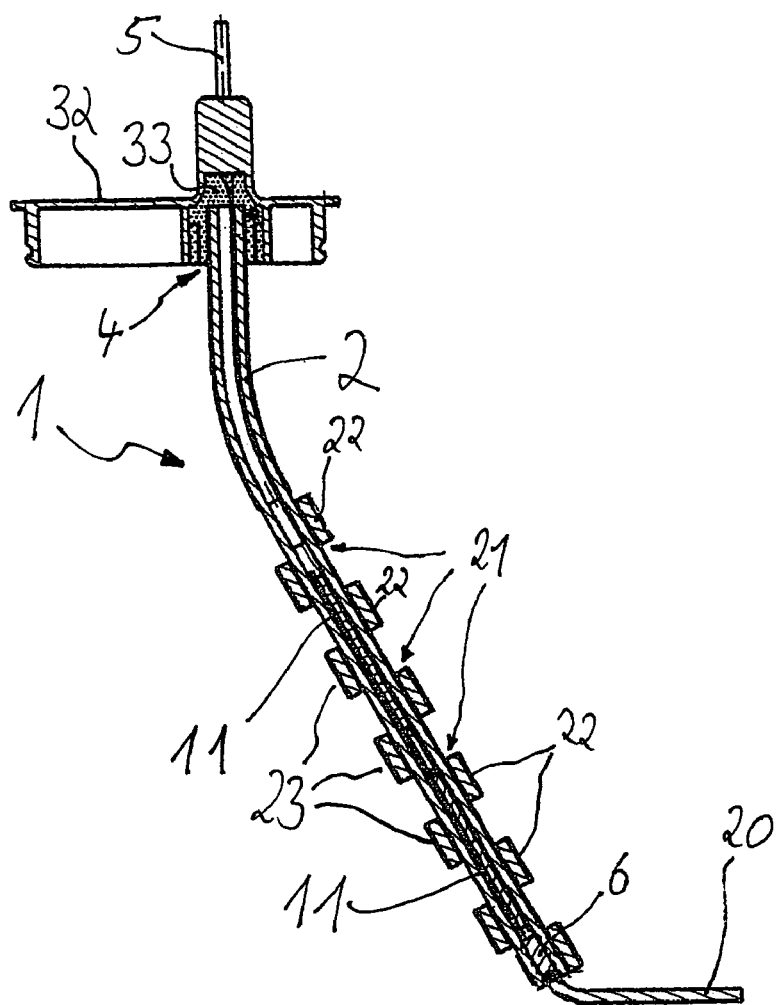
FIG. 3 shows a longitudinal section of the exemplary embodiment shown in FIG. 1.

The exemplary embodiment of an electrical heating facility 1 shown in FIGS. 1 to 3 comprises a metallic housing tube 2 with a first end 3 for immersion into the liquid to be heated and a second end 4 with an electrical connection terminal 5. The housing tube 2 is a special section tube that is sealed on its first end 3 by a leak-proof closure 6 made of plastic material (FIG. 3). This closure is a stopper that is shown in detail in FIGS. 6 and 7.

The special section tube 2 is a rectangular tube with two long sides 8 and two short sides 9. As shown in FIG. 3, at least one plate-shaped heating element 11 is situated inside the special section tube 2. The number of heating elements 11 is selected for each individual application in accordance with the heating power and required length of the special section tube 2. The heating elements 11 are PTC heating elements comprising intrinsic temperature limitation such that resource-consuming measures for temperature limitation are not needed.

Figure 5:
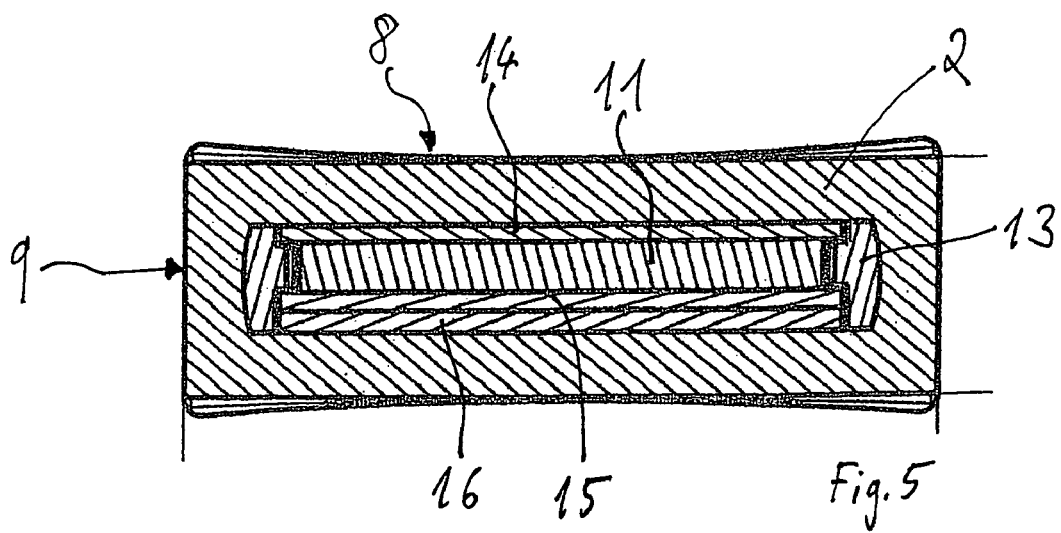
FIG. 5 shows a cross-section of a heating facility according to the invention.

The internal structure of the heating facilities is best evident from the longitudinal and cross-sectional views of FIGS. 3 and 5. The heating elements 11 are central components of a heating insert that includes a mounting frame 13, two contact panels 14, 15, and one insulation strip 16.

More details of a heating insert of this type are described in DE 102 58 257 A1, the pertinent disclosure of which is included into the present application by way of reference. The use of a heating insert with a mounting frame 13 simplifies the production significantly, since it involves that an easy-to-handle unit is inserted into the special section tube 2. After insertion of the heating insert, the special section tube 2 is compressed such that the heating element or elements 11 is/are clamped inside the housing tube 2. Compressing the special section tube 2 provides for good thermal contact between the heating elements 11 and the housing. However, it is also feasible to dispense with compressing and to brace the heating elements, for example by means of spring elements, inside the housing.

In order to improve the heat transfer, a metallic heat conducting element 20 is attached to the special section tube 2. The heat conducting element 20 is a stamped-out heat conducting plate made of a spring elastic or a cold-hammered aluminum alloy, for example of AlMgSi, in particular of $AlMgSi_{0,5...1}$. The heat conducting plate 20 is 2 to 3 mm thick and comprises multiple slits 21 through which penetrates the special section tube 2 such that alternating plate sections 22, 23 of the heat conducting plate 20 rest against opposite sides of the special section tube 2. The plate sections 22, 23 are bent apart during the assembly and the special section tube 2 is threaded-in into the slit-containing sections in an alternating fashion. By this means, a friction-tight attachment between the heat conducting plate 20 and the special section tube 2 is generated and thus provides for slip-proof connection and good heat coupling. In order to improve this friction-tight attachment and heat coupling, the heat conducting plate 20 is compressed again after it is slid onto the special section tube 2.

For the purpose of clarity, the heat conducting element is not shown in FIG. 5, but only in FIGS. 1 to 4.

FIG. 4 shows an embodiment of a liquid container 30 for a motor vehicle, in which the heating facility 1 described above has been installed. The liquid container 30 shown serves to take up washing liquid for a window washing facility. The special section tube 2 of the heating facility 1 was bent in order to adapt it to the given shape of the liquid container 30.

If low temperatures cause the washing liquid to freeze in the container 30 shown, it is particularly important to first thaw the liquid in the intake area 31 of the liquid pump 29 to allow washing liquid to be sprayed as soon as possible. For this reason, a section 24 of the heat conducting element 20 protrudes into the intake area of the liquid pump in the exemplary embodiment shown.

On its second end 4, the special section tube 2 of the heating facility 1 is connected to a lid 32 in a substance-to-substance bond fashion. The lid 32 serves to close an opening of the liquid container 30. As shown in the sectional view depicted in FIG. 3, the lid 32 bears the connection terminal 5 of the heating facility 1 allowing the heating facility 1 to be easy to install in its assembled place in a motor vehicle. A clearance 33 between the lid 32 and the second end 4 of the special section tube 2 is filled with a pourable sealing compound, preferably based on polyurethane. By this means, leak-proof sealing of the special section tube 2 is attained, and, at the same time, manufacturing tolerances can be balanced out. Alternatively, the lid 32 can be provided in the form of a rubber preform.

As mentioned above, a first end 3 of the special section tube 2, which according to its purpose immerses into the liquid to be heated, is sealed with a closure 6 made of plastic material. This closure 6 is a stopper made of an elastomeric plastic material or a caoutchouc mixture, preferably an ethylene-propylenediene-caoutchouc, with an excellent permanent set. Preferably, the short-term permanent set is less than 20%. From FIG. 6 it is evident that the cross-section of the stopper 6 is adapted to match the concave recesses of the sides 8 of the special section tube 2.

Figure 6:
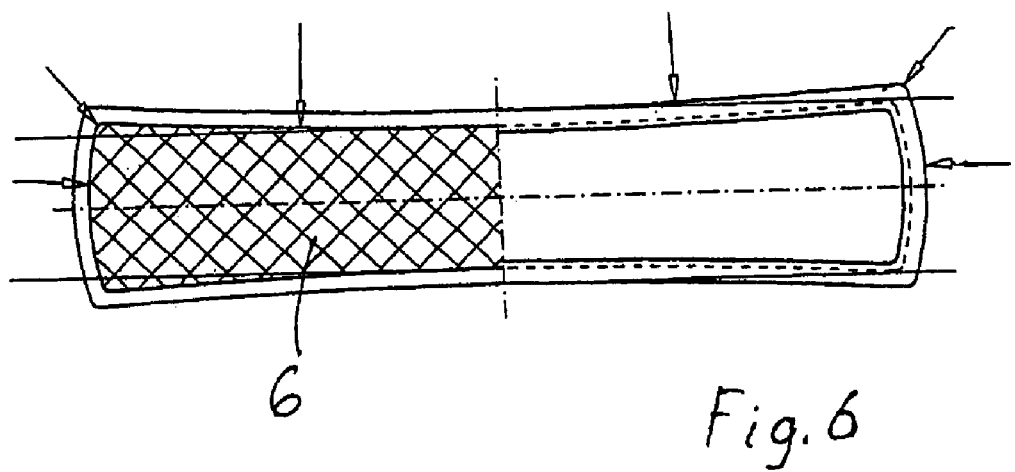
FIG. 6 shows a cross-section of a stopper for sealing the housing tube of the heating facility.

Prior to being compressed, the long sides of the special section tube 2 have recesses that are concave in shape. The stopper 6 whose cross-section is shown in FIG. 6, has a matching shape. After insertion of the heating insert, the area of the heating elements of the special section tube 2 is compressed. Compressing causes the long sides to become level in the area of the heating elements. This generates a spring tension that provides for good thermal contact between the special section tube 2 and the heating elements. It has been evident that it is advantageous for sealing of the special section tube 2 if a first end 3 of the tube is not compressed.

Figure 7:
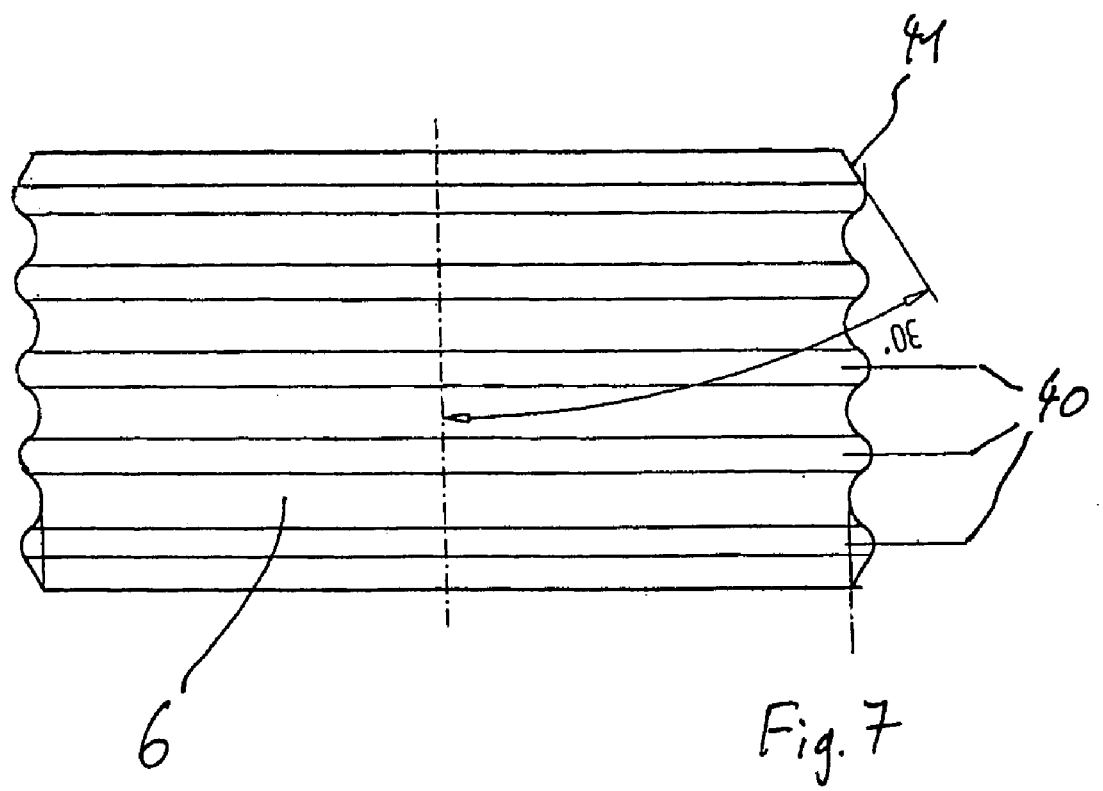
FIG. 7 shows a top view of the stopper shown in FIG. 6.

The stopper 6 is provided with a bevel allowing it to be inserted more easily into the special section tube 2. As shown in FIG. 7, the stopper 6 has multiple surrounding ledges 40 in order to improve its seating in the special section tube 2 and to increase the sealing effect. Under normal conditions, the plastic material used for the stopper 6 has a Shore A hardness of 60 to 70 and is temperature-resistant at least from −40° C. to 125° C.

The invention claimed is:

1. Electrical heating facility for the heating of liquid in a motor vehicle, comprising:
    a metallic housing with a first end for immersion in the liquid to be heated and a second end with an electrical connection terminal;
    at least one heating element that is arranged in the housing; and
    at least one metallic heat conducting element for conducting heat away from the housing; wherein the heat conducting element is a heat conducting plate comprising multiple slits used to slide the plate onto the housing.

2. Electrical heating facility according to claim 1, wherein the heat conducting element is compressed against the housing after being slid onto the housing.

3. Heating facility according to claim 1, wherein the heat conducting element is made of an aluminum alloy.

4. Heating facility according to claim 1, wherein the housing protrudes through the multiple slits of the heat conducting plate such that alternating panel sections of the heat conducting plate rest against opposite sides of the housing.

5. Heating facility according to claim 1, wherein the heat conducting plate is at least 2 mm thick.

6. Heating facility according to claim 1, wherein the heat conducting element or elements form an open structure, which is exposed to the liquid to be heated.

7. Heating facility according to claim 1, wherein the housing is selected from a group consisting of: a tube and a special section tube.

8. Heating facility according to claim 7, wherein the tube is bent.

9. Heating facility according to claim 7, wherein the tube is made of an aluminum alloy.

10. Heating facility according to claim 7, wherein the special section tube is a rectangular tube with two long sides and two short sides.

11. Heating facility according to claim 10, wherein the long sides possess concave curvature at the first end.

12. Heating facility according to claim 11, wherein the long sides are less concave in shape in the area of the at least one heating element than at the first end.

13. Heating facility according to claim 7, wherein the first end of the tube is sealed by means of a stopper made of plastic material.

14. Heating facility according to claim 13, wherein the stopper comprises at least one surrounding ledge.

15. Heating facility according to claim 13, wherein the plastic material of the stopper has a Shore A hardness of 40-80.

16. Heating facility according to claim 13, wherein the plastic material of the stopper is selected from a group consisting of an elastomeric plastic material, and a thermoplastic.

17. Heating facility according to claim 13, wherein the plastic material is selected from a group consisting of a caoutchouc mixture, an NBR, HNBR, and an ethylene-propylenediene-caoutchouc.

18. Heating facility according to claim 17, wherein the caoutchouc mixture is crosslinked by peroxide linkage.

19. Heating facility according to claim 17 or 18, wherein the caoutchouc mixture contains a fluoro- or perfluoro-caoutchouc.

20. Heating facility according to claim 13, wherein the plastic material has a short-term permanent set of less than 30%.

21. Liquid container for a motor vehicle comprising:

an intake fitting for a liquid pump for conveying the liquid and an electrical heating facility for heating the liquid, comprising:

a metallic housing with a first end for immersion in the liquid to be heated and a second end with an electrical connection terminal, at least one heating element that is clamped in the housing, and at least one metallic heat conducting element for conducting heat away from the housing, characterized in that a heat contact surface of the at least one heat conducting element rests against the intake fitting of the liquid pump.

22. Liquid container according to claim 21, wherein the heat conducting element comprises a hole through which the intake fitting protrudes.

23. Liquid container according to claim 21, wherein the intake fitting is touched on at least half of its circumference by the heat contact surface.

24. Liquid container according to claim 21, wherein the second end of the housing of the heating facility is connected to a lid in a substance-to-substance bond fashion, the lid serving to close an opening of the liquid container.

25. Heating facility according to claim 1 wherein the heat conducting plate is between 2 mm and 3 mm thick.

* * * * *